(12) United States Patent
Borderi et al.

(10) Patent No.: US 12,304,748 B2
(45) Date of Patent: May 20, 2025

(54) GROUPING DEVICE AND METHOD FOR GROUPING DISCRETE ROWS OF ARTICLES INTO A CONTINUOUS ROW OF ARTICLES

(71) Applicant: G.D S.P.A., Bologna (IT)

(72) Inventors: Luca Borderi, Bologna (IT); Gianluca Parisini, Bologna (IT); Antonio Gigante, Bologna (IT)

(73) Assignee: G.D S.P.A., Bologna (IT)

( * ) Notice: Subject to any disclaimer, the term of this patent is extended or adjusted under 35 U.S.C. 154(b) by 71 days.

(21) Appl. No.: 18/018,749

(22) PCT Filed: Jul. 26, 2021

(86) PCT No.: PCT/IB2021/056722
§ 371 (c)(1),
(2) Date: Jan. 30, 2023

(87) PCT Pub. No.: WO2022/029550
PCT Pub. Date: Feb. 10, 2022

(65) Prior Publication Data
US 2023/0303337 A1    Sep. 28, 2023

(30) Foreign Application Priority Data
Aug. 7, 2020  (IT) .......................... 102020000019672

(51) Int. Cl.
*B65G 47/28* (2006.01)
*B65G 47/248* (2006.01)
(Continued)

(52) U.S. Cl.
CPC ............. *B65G 47/28* (2013.01); *B65G 47/34* (2013.01); *B65G 47/82* (2013.01); *B65G 47/248* (2013.01)

(58) Field of Classification Search
CPC ...... B65G 47/248; B65G 47/82; B65G 47/28; B65G 47/34
(Continued)

(56) References Cited

U.S. PATENT DOCUMENTS 4,780,872 A    10/1988   Masuda et al.
9,463,888 B2 * 10/2016   Overley ................. B65G 47/71
(Continued)

FOREIGN PATENT DOCUMENTS

CN    209160824 U    7/2019
DE    10007627 A1    9/2001
(Continued)

OTHER PUBLICATIONS

International Search Report and Written Opinion for International Application No. PCT/IB2021/056722 filed on behalf of G.D S.P.A. on Jul. 26, 2021. Mailed on Feb. 25, 2022. 22 pages.

*Primary Examiner* — James R Bidwell
(74) *Attorney, Agent, or Firm* — Steinfl + Bruno LLP (57) ABSTRACT

A grouping device includes a feeding device with a plurality of elongated transport elements to support at least one of discrete rows of articles to be grouped and defining a respective seat in which an open or openable longitudinal end is defined. The grouping device further includes a pusher device to contact a discrete row of articles so that the discrete row slides out of one of the elongated transport elements, and an unloading device to receive, through an interchange zone, the discrete row unloaded through a longitudinal end. The feeding device is configured to position, in sequence, each elongated transport element at the interchange zone.

15 Claims, 10 Drawing Sheets

(51) Int. Cl.
*B65G 47/34* (2006.01)
*B65G 47/82* (2006.01)

(58) Field of Classification Search
USPC .................................................. 198/418, 430
See application file for complete search history.

(56) References Cited

U.S. PATENT DOCUMENTS

| | | |
|---|---|---|
| 10,112,776 B2 | 10/2018 | Rasi |
| 10,343,852 B2 | 7/2019 | Roth |
| 11,554,920 B2 * | 1/2023 | Henrich ................. B65G 43/08 |
| 2014/0167301 A1 | 6/2014 | Schoenberger et al. |
| 2020/0324974 A1 * | 10/2020 | Gorman ............... G06Q 10/087 |

FOREIGN PATENT DOCUMENTS

| | | |
|---|---|---|
| DE | 102017129689 A1 | 7/2016 |
| EP | 0943562 A1 | 9/1999 |
| JP | H0361400 U | 9/1991 |
| JP | H0551123 A | 3/1993 |
| WO | 2016/107655 A1 | 7/2016 |

\* cited by examiner

GROUPING DEVICE AND METHOD FOR GROUPING DISCRETE ROWS OF ARTICLES INTO A CONTINUOUS ROW OF ARTICLES

CROSS REFERENCE TO RELATED APPLICATIONS

The present application is the US National Stage of International Patent Application No. PCT/IB2021/056722, filed internationally on Jul. 26, 2021, which, in turn, claims priority to Italian Application No. IT 102020000019672, filed on Aug. 7, 2020.

The present invention relates to a grouping device for grouping discrete rows of articles into a continuous row, of a type intended for use in an article packaging machine.

It is also directed to a packaging machine comprising such a grouping device as well as to a method for grouping discrete rows of articles into a continuous row of articles. The present invention finds a preferred, though not exclusive, application in the field of packaging of loose articles in a box, such as capsules for infusion products, for example coffee, a field to which reference may be made hereafter without loss of generality.

In particular, in the relevant technical field, packaging machines are known in which the articles to be packaged are fed into a feed station of the machine and transferred to different article processing areas, in which the articles are, for example, filled with a product intended to be contained within them, or sealed, or packaged.

In a known embodiment, the articles are fed onto the packaging machine arranged in discrete rows. In this embodiment, the articles are grouped together in a continuous row to be loaded onto a conveyor belt of the packaging machine, which is responsible for moving the articles to the different areas that make up the machine. During the packaging steps, there are one or more areas in which the articles grouped in rows are individually separated to carry out one or more of the above operations.

In this description as well as in the appended claims, certain terms and expressions are deemed to have, unless otherwise expressly indicated, the meaning expressed in the following definitions.

The term "article" means any solid product which, within an industrial production line, can be picked up, moved and dropped off from a feeding unit in order to be fed into a packaging machine.

The feeding unit can be configured to pick up one or more discrete rows of such articles placed in a tray and drop it off at a conveyor device.

The articles can be identical to each other, or they can differ from each other in some characteristics such as for example the conformation, the composition, the colour or their orientation.

The articles can be, for example, food and confectionery products already packed in individual containers or wrappers, such as coffee capsules or other infusion type beverages, bottles and cartons of beverages, yoghurt pots, individual chocolates (wrapped or bare), candies, small boxes, pouches containing solid, liquid or semi-solid food products; moreover, products of the ceramic industry, absorbent products for hygienic use, products of the tobacco industry, products of the cosmetic industry, products of the pharmaceutical industry, products of the personal & home care industry.

The term "discrete row" referring to articles means a plurality of single articles grouped in a linear arrangement. Preferably, the articles grouped into discrete rows are stacked in a nested configuration in separate stacks of articles. More generally, the articles can be configured to maintain the alignment, i.e. their linear sorting position, during the movement. Alternatively, the use of additional retaining elements may be envisaged in order to maintain this order.

The term "continuous row" referring to articles means a plurality of single articles, in an undefined number, grouped in a linear arrangement. Along the continuous row the articles are grouped uniformly, with no separation between one article and another, or with uniform separations along the row. Preferably, the articles grouped in continuous rows are stacked in a nested configuration in a single, continuous stack of articles. More generally, the articles can be configured to maintain the alignment, i.e. their linear sorting position, during the movement. Alternatively, the use of additional retaining elements may be envisaged in order to maintain this order.

The term "station" means any area specifically designated to carry out an operation to feed articles. This zone can be either defined by a specific component of the feeding unit or more generally of a processing line, or by a portion of such a component. Each station can also be defined as a zone for performing several operations, unless otherwise specified.

The term "loose" referring to articles means a plurality of single articles which are separated and not secured to each other, so that each of them can be moved and treated independently of the other articles.

A plurality of articles is moved, removed, dropped off or otherwise treated "in group" when all the articles of the plurality are moved, removed, dropped off, or otherwise treated, in the same time interval or, in other words, simultaneously.

For example, the articles are rotated "in groups" when they all begin and end a rotation movement at substantially the same instant.

The term "direction" refers to a path through two identified points in space. Preferably the direction corresponds to the line passing through these points, but curved components may define corresponding curved directions between two characteristic points of the component.

The term "direction" refers to the orientation of the directions between the two points. In other words, a direction identifies two opposite directions, a first direction oriented from the first point to the second point and a second direction oriented from the second point to the first point.

It is also specified that the expression "moving an object between a first position and a second position" means both the movement from the first position to the second position and the movement from the second position to the first position.

This definition applies equally to similar expressions of movement, such as for example transferring or moving a generic object between two positions or between two zones or even between two different operating configurations.

The Applicant, in the context of the constant need to increase the performance and efficiency of production lines, has preliminarily observed that, in a line for the packaging of articles, the speed at which the articles are fed into the packaging machine, for example with respect to the placing of the articles on a conveyor device, can constitute an important element of limitation of the production capacity of the line itself.

This limitation is even more critical if the packaging machine is configured to operate with articles grouped in a continuous row along the packaging line by means of the conveyor device and, at the same time, the articles are stored in discrete rows before being fed into the machine. This may occur, for example, in order to optimise the space required for storing articles prior to packaging thereof. In particular, the Applicant has noted that the transformation of the single discrete rows of articles into a single continuous row requires individual manipulation of each discrete row. This leads to a high degree of operational complexity, making it necessary in some areas to carry out manual activities in the steps of loading the articles.

In order to increase the loading speed of the articles along the packaging line, the Applicant has therefore perceived that this could be done by exploiting the geometry of the discrete stacks, moving them appropriately in order to group them in a continuous row prior to their feeding into the packaging line.

In light of this initial insight, the Applicant has then observed that, in some known feeding units, articles are removed from special containers to be placed manually on the conveyor devices of the packaging line.

The Applicant has also noted that complex movements of the discrete rows of articles in the loading step negatively affects the loading speed of the feeding line.

Finally, the Applicant has found that by sliding the discrete rows of articles in sequence to an interchange zone by means of a feeding device, it is possible to group the discrete rows into a continuous row by means of a simple movement, which can be conferred by means of kinematics that can be easily implemented and controlled. Thanks to these features, the feeding unit can group the discrete rows into a single continuous row for feeding the packaging line.

In a first aspect thereof, therefore, the present invention is directed to a grouping device for grouping discrete rows of articles into a continuous row of articles.

Preferably, the grouping device comprises a feeding device comprising a plurality of elongated transport elements configured to support one of said discrete rows of articles, wherein each elongated transport element defines a respective seat mainly extending along a longitudinal axis in which an open or openable longitudinal end is defined.

Preferably, the grouping device comprises a pusher device configured to abut against the discrete row of articles so that it slides out of one of said elongated transport elements through its respective longitudinal end.

Preferably, the grouping device comprises an unloading device configured to receive through an interchange zone the discrete row discharged through the longitudinal end.

Preferably, the feeding device is configured to position, in sequence, each elongated transport element at said interchange zone.

Thanks to these features, the grouping device makes it possible to obtain a continuous row of articles, suitable for use in the different workstations of a packaging line, from a plurality of discrete lines. The possibility of using a pusher element makes it possible to simplify the movement operations of discrete lines, which can be grouped in the unloading device in sequence, sliding in the axial direction defined by the transport elements. The feeding unit can therefore be used effectively in industrial lines where high production capacity and high efficiency are required.

The Applicant also considers that the possibility of feeding the production line with a continuous row of articles, obtained from discrete rows, makes it possible to combine the advantages in terms of speed brought about by continuous lines with those of simplification of storage and movement during loading associated with the use of discrete rows.

In a second aspect thereof, the present invention relates to an article packaging machine, comprising at least one grouping device made according to the first aspect and provided to transport discrete rows of articles through the conveyor device to further article processing and packaging stations.

The packaging machine according to the invention may advantageously present very high production capacities, precisely because it uses a continuous row entering its various workstations, limiting the operational complexities that may arise in the step of loading continuous lines in other known packaging machines.

In a third aspect thereof, the present invention relates to a grouping method for grouping discrete rows of articles into a continuous row of articles each discrete row by defining a respect axis of alignment.

Preferably, the method comprises arranging a plurality of discrete rows of articles on a feeder device so that each discrete stack of articles defines a respective axis of alignment.

Preferably, the method comprises pushing a discrete row of said plurality of rows so that it slides along said respective axis of alignment.

Preferably the method comprises discharging the discrete row from said feeder device by passing it, discharged through the longitudinal end, through an interchange zone.

Preferably, the method comprises moving the plurality of discrete rows of articles by said feeder device so as to position, in sequence, each discrete stack in said interchange zone.

In a fourth aspect thereof, the present invention relates to an apparatus for loading discrete rows of articles into a packaging machine.

Preferably the loader apparatus comprises a feeding device including a plurality of elongated transport elements configured to support one of said discrete rows of articles, wherein a plurality of seats are defined mainly extending along a longitudinal axis.

Preferably, the loading apparatus comprises a control device configured to control one or more characteristics of said discrete rows in said feeding device, said characteristics preferably comprising a direction of alignment of said discrete row of items with respect to said longitudinal axis.

Preferably, the loader apparatus comprises an unloading device configured to receive through an interchange zone the discrete row unloaded by the feeding device.

Preferably said unloading device comprises a rotation device configured to reverse the direction of alignment of said discrete row and wherein the feeding device is configured to sequentially position each elongated transport element at said interchange zone.

Thanks to these characteristics, the loader apparatus makes it possible to make available a plurality of discrete rows all oriented in the same direction. In this way all discrete rows that are fed can be made available for use in a continuous row of articles. This has the advantage of reducing the number of discrete rows discarded during the loading operations.

In a fifth aspect thereof, the present invention relates to an article packaging machine, comprising at least one loader apparatus made according to the fourth aspect and provided to transport discrete rows of articles through the conveyor device to further article processing and packaging stations.

In a sixth aspect thereof, the present invention relates to a method for loading discrete rows of articles into a packaging machine.

Preferably, the method comprises arranging a plurality of discrete rows of articles on a feeder device so that each discrete stack of articles defines a respective axis of alignment.

Preferably, the method comprises monitoring a direction of alignment of said discrete row with respect to said axis of alignment.

Preferably the method comprises discharging the discrete row from said feeder device by passing it, discharged through the longitudinal end, through an interchange zone.

Preferably the method comprises reversing the direction of alignment of said discrete row if it does not correspond to a predetermined direction, preferably reversing the direction of alignment comprises rotating said discrete row 180° with respect to said axis of alignment.

Preferably, the method comprises moving the plurality of discrete rows of articles by said feeder device so as to position, in sequence, each discrete stack in said interchange zone.

The present invention, in at least one of the aforesaid aspects, may have at least one of the further preferred features set out below.

Preferably said pusher device comprises at least one pusher element movable in a direction substantially parallel to said longitudinal axis.

In this way the discrete row is properly guided along the longitudinal direction, facilitating the exit and the discharge from the transport element.

Preferably said pusher device comprises a device for moving said pusher element, said movement device being capable of transporting said pusher element along a closed path, said closed path comprising a straight segment, preferably parallel to said longitudinal axis.

Thanks to this feature, it is possible to provide for a cyclic movement of the pusher element, which can then be advantageously controlled by a motor driven in a single direction, simplifying the control of the pusher device.

In some embodiments, said closed path is defined by a strip-like element wound on a pair of pulleys.

This makes it possible to use an electric motor, such as a brushless motor, to move the pusher elements.

Preferably said strip-like element comprises a toothed belt. This solution contributes to high efficiency and robustness of the structure, while allowing high speeds.

Preferably, said pusher elements are in the form of rods that develop away from said closed path.

In this way, the pusher device can be placed sufficiently far from the feeding device, e.g. by placing it above the latter, so as to rationalise the size of the device.

In preferred embodiments, said pusher device comprises a pair of pusher elements placed at different positions along said closed path in such a way that when a first pusher element of said pair of pusher elements travels along said straight path, a second pusher element of said pair of pusher elements travels along another segment of said closed path, preferably opposite to said straight segment.

In this way, it is possible to avoid or at least limit any interruptions in the thrust action even in the case of the cyclical drive that the closed path allows according to what has been previously illustrated.

Preferably the grouping device comprising a pair of pusher devices, each pusher device being configured in such a way as to abut against a respective discrete row of articles, located on a respective elongated transport element.

Preferably the pusher devices of said pair of pusher devices are arranged side by side. In some embodiments, the pulleys of a first pusher device of said pair of pusher devices are configured to rotate about the same axis of rotation as the pulleys of a second pusher device of said pair of pusher devices.

These features make it possible to double the productivity of the grouping device, while keeping the overall dimensions small and rationalising the components used in it.

Preferably, the feeding device defines a transport path of said elongated transport elements which comprises at least one curved segment.

Preferably said pair of pusher devices is configured in such a way that the pusher elements of each pair of pusher devices abut against the discrete row of articles at a respective position of said curved segment.

In this way, the action of the two pusher devices takes place in an area in which the transport elements can be more widely spaced, as they follow the course of the curved segment of the transport path.

Preferably, the loader apparatus comprises a pusher device configured to abut against the discrete row of articles so that it slides out of one of said elongated transport elements through its respective longitudinal end. Preferably, a discrete row of said plurality of rows can be pushed so that it slides along said respective axis of alignment.

In preferred embodiments, the transport path comprises an ascending vertical segment and a descending vertical segment, said ascending vertical segment and said descending vertical segment being joined by said curved segment.

In some embodiments, said curved segment has an angular development of 180° so as to reverse the direction of said transport direction.

These characteristics make it possible to create a feeding device with a predominantly vertical development, with a consequent reduction in the overall dimensions of the grouping device.

Preferably, the loading device comprises a control device configured to control one or more characteristics of the discrete rows in said feeding device.

Preferably said control device comprises an optical device.

In preferred embodiments, said optical device comprises a vision group.

This makes it possible to check for the presence of discrete rows that are not suitable for use in the packaging line.

Preferably said control device is configured to temporarily inhibit actuation of said pusher device in the event that one or more of the discrete row characteristics controlled by the control device does not correspond to an expected value.

This prevents the feeding of unsuitable discrete rows without requiring the use of any additional element to prevent their passage towards the unloading device.

In some embodiments, the loading device comprises a discard zone, said feeding device being configured to transport the discrete row to said discard zone if one or more of the characteristics discrete row controlled by the control device does not correspond to an expected value. Preferably said discard zone comprises a discard container preferably located at the end of said vertical downward segment.

In some embodiments, it is intended to keep said discrete row on said feeder device and to transport said discrete row to a discard zone if one or more of the discrete row characteristics checked do not correspond to an expected value.

Thanks to these features, it is possible to collect all the discarded rows, allowing them to be used or possibly inspected, e.g. in order to assess the causes that led to their rejection.

Preferably it is provided to unload said discrete row transported to the discard zone from the feeder device, preferably by fall.

In this way, the use of specific devices for removing discrete rows to be discarded can be avoided.

Preferably said features comprising preferably a direction of alignment of said discrete row of articles with respect to said longitudinal axis.

In preferred embodiments, said unloading device comprises a rotation device configured to reverse the direction of alignment of said discrete row.

In this way it is possible to avoid rows oriented in the wrong direction being discarded in the absence of further defects.

Preferably said rotation device comprises a rotating support configured to rotate 180° about an axis perpendicular to an axis of alignment of said discrete row.

Thanks to this feature, it is possible to reverse the rows easily and without requiring specific row manipulation.

Preferably, the rotation device comprises a pair of rotating supports mounted on a common rotating platform.

With this feature, it is possible to use the row direction correction capability even if a pair of pushers is used, optimising the number of components used.

In some embodiments, said rotating support is translatable with respect to a position of alignment with the longitudinal axis of the elongated transport element on which said pusher device acts. In this way, even if the rotating support is not positioned symmetrically and passing through the centre of rotation of the rotating support, the correct alignment of the rotating support, after rotation, with other components of the grouping device can be achieved. This is particularly advantageous where a pair of rotating supports mounted on a common rotatable platform is included.

Preferably, said rotating support is placed immediately downstream of said interchange zone.

Preferably, said rotating support is interposed between said interchange zone and said support element.

Preferably, said pusher device is configured to abut against said discrete row so that it slides along said rotating support after crossing the longitudinal end of said elongated transport element.

Thanks to these characteristics, it is possible to obtain a linear and continuous movement of the discrete rows exiting the elongated transport elements.

Preferably, said rotating support comprises additional lateral walls to define a guide of said discrete rows.

Preferably, said unloading device comprises a conveyor through which said discrete rows are passed.

Preferably, said conveyor comprises a chute projecting towards said rotating support, wherein a recess in said lateral walls is defined to accommodate said chute when said lateral walls are aligned with said longitudinal axis.

In this way, a suitable continuity in the support surface of the discrete rows can be guaranteed during their movement and, at the same time, the rotation capacity of the rotating support can be provided for.

In some embodiments, the chute and/or the rotating support and/or the support element each define a respective sliding surface of the discrete rows. Preferably, the sliding surface of the chute is at a position vertically higher than that of the rotating support and/or support element. Preferably, the sliding surface of the rotating support is at a higher vertical position than that of the support element.

This facilitates the passage of the discrete row between one surface and another, limiting the risk that it may get caught up in the transfer to the rotating support and/or support element.

In preferred embodiments said unloading device comprises a support element configured to receive a plurality of discrete rows discharged from said feeding device and form said continuous row.

In some embodiments, each of said elongated transport elements defines a direction of movement of said discrete row of articles towards said open or openable longitudinal end. This makes it possible to unambiguously define the direction along the longitudinal direction of the elongated transport elements towards which the discrete rows should be guided.

Preferably in said elongated transport elements, a further longitudinal end is defined comprising an abutment edge configured to abut against said discrete row of articles in the opposite direction to said direction of sliding. In this way, the sliding of discrete rows in the opposite direction to that required by the invention can be conveniently prevented.

The characteristics and advantages of the invention will become clearer from the detailed description below of an embodiment illustrated, by way of non limiting example, with reference to the appended drawings wherein.

Figure 1:
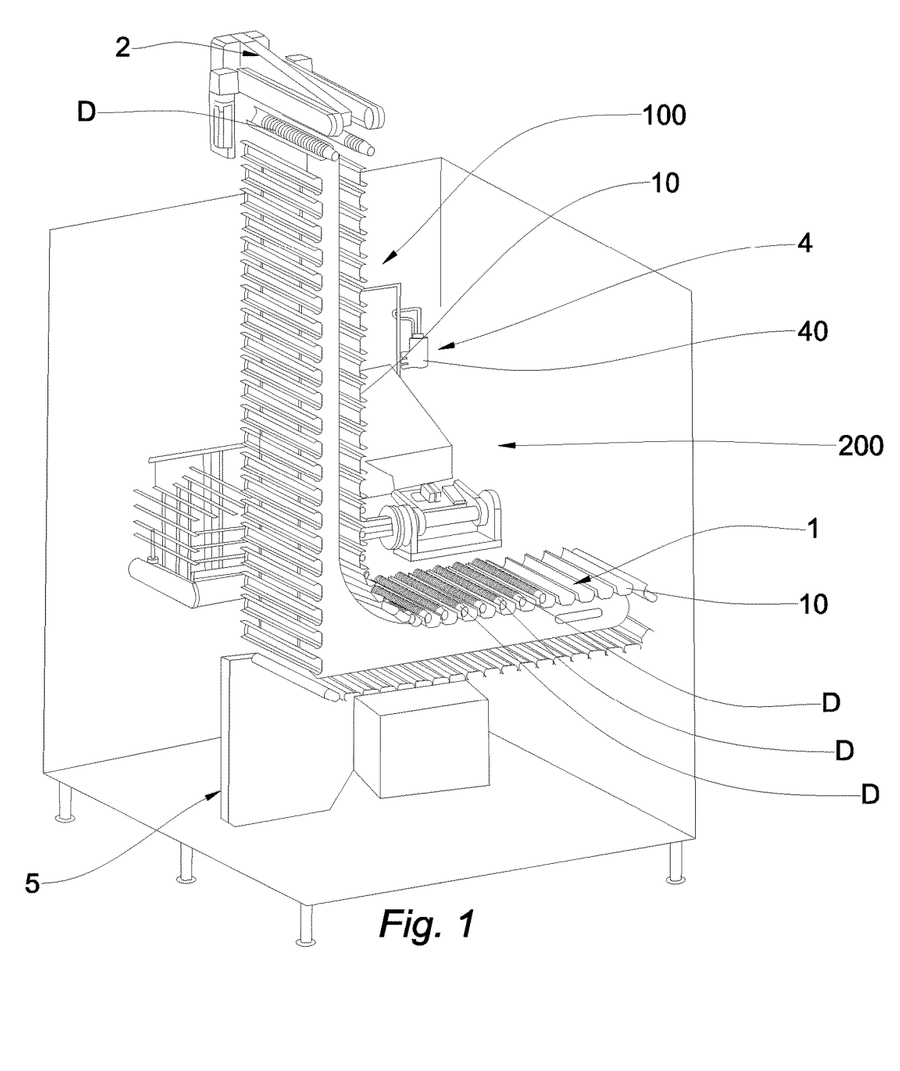
FIG. 1 is a schematic view in side perspective of a grouping device made in accordance with the present invention.

With reference initially to FIG. 1, a grouping device for a packaging machine made in accordance with the present invention is globally represented with 100.

The packaging machine, not shown in the Figure, may for example be of a type suitable for packaging coffee in capsules. It will therefore be appreciated that, in such an example, articles I correspond to the capsules and, the grouping device can be applied in the feeding of empty capsules, prior to the filling and closing thereof.

However, the feeding unit 100 of the present application may also find application in different packaging areas and the articles fed therefrom may include a variety of products, as illustrated above.

Figure 2:
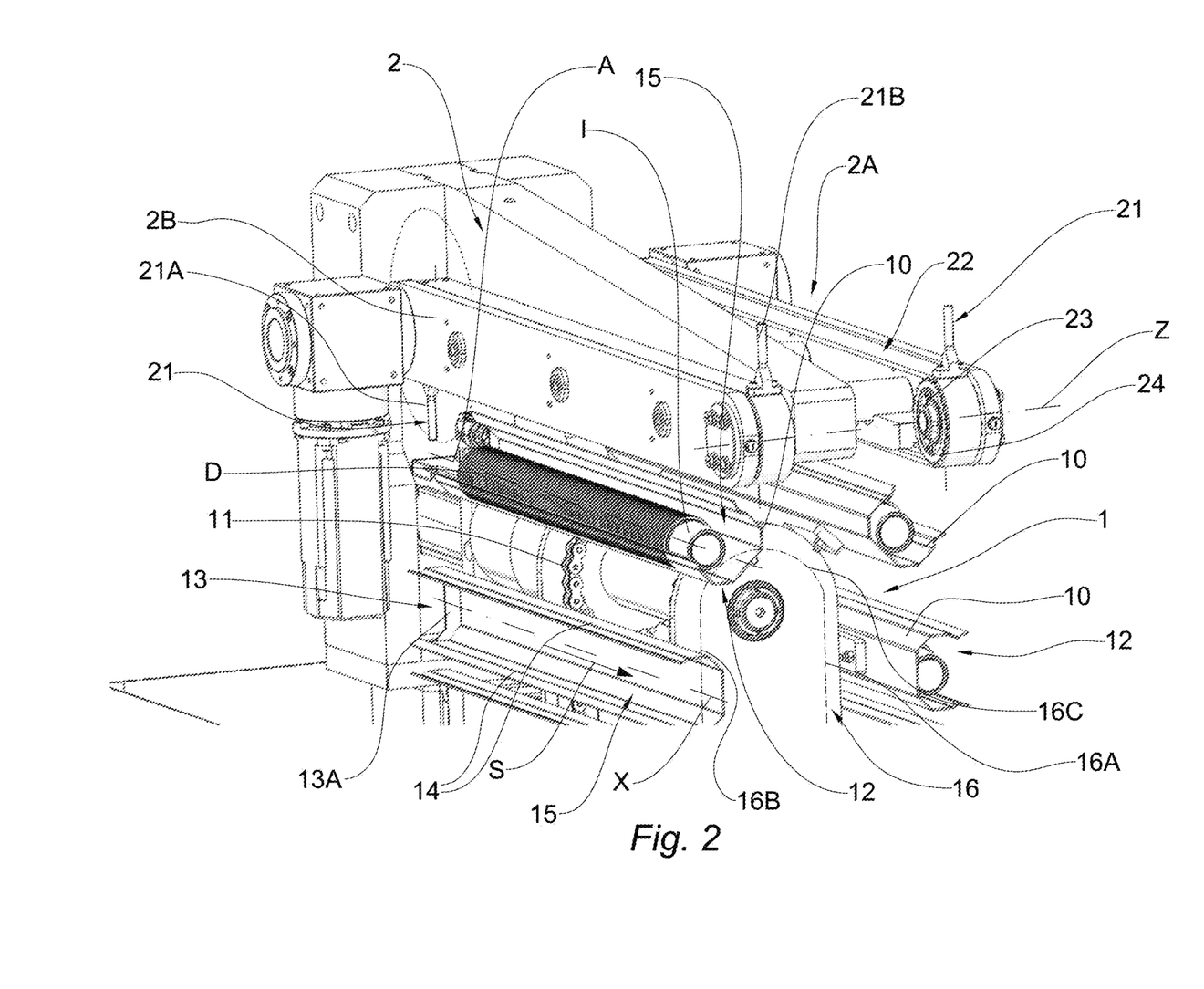
FIGS. 2 to 5 are schematic views in side perspective, in detail, of the device of FIG. 1 during different operating step.

As visible in the example embodiment of FIG. 2, in preferred embodiments, the grouping device 100 comprises a feeding device 1 that includes a plurality of elongated transport elements 10 configured to support one of said discrete rows D of articles I.

Preferably, each elongated transport element 10 defines a respective seat 15 mainly extending along a longitudinal axis X.

Advantageously, the transport elements 10 are configured so that they can be transported by means of the feeding device 1 along a path, preferably a closed path. The movement of the transport elements 10 can, for example, take place by means of a catenary 11.

As can be seen in the example of FIG. 2, in some embodiments, the elongated transport elements 10 comprise lateral walls 14 configured to retain a discrete row D. The lateral walls 14 may preferably be developed along the longitudinal axis X consequently retaining the discrete rows D within the seat 15 which, therefore, may advantageously be formed by the lateral walls 14 themselves. The discrete row in turn defines an axis of alignment A which advantageously is arranged substantially parallel to the longitudinal axis X when the row D is housed in the seat 15.

In preferred embodiments, an open or openable longitudinal end 12 is defined in the seat 15, which is of such a shape and size as to allow the discrete row contained in the seat 15 to pass through, and thereby allow the discrete row D to be moved away from the transport element 10.

Preferably, each of the elongated transport elements 10 also defines a respective sliding direction S of the discrete row D of articles I along the direction defined by the longitudinal axis X towards the aforesaid longitudinal end 12. In other words, in the transport elements 10 it is advantageous to define unambiguously a direction along which the discrete row D may slide in order to be moved away from the element 1 itself.

It will also be appreciated that in the elongated transport elements 10, a further longitudinal end 13 is also preferably defined comprising an abutment edge 13A configured in such a way as to abut against said discrete row D of articles I in a direction opposite to said sliding direction S.

In this way the discrete row can only be unloaded from the transport element 10 by sliding in the direction of sliding S, the translation in the opposite direction being prevented or at least limited.

Figure 3:
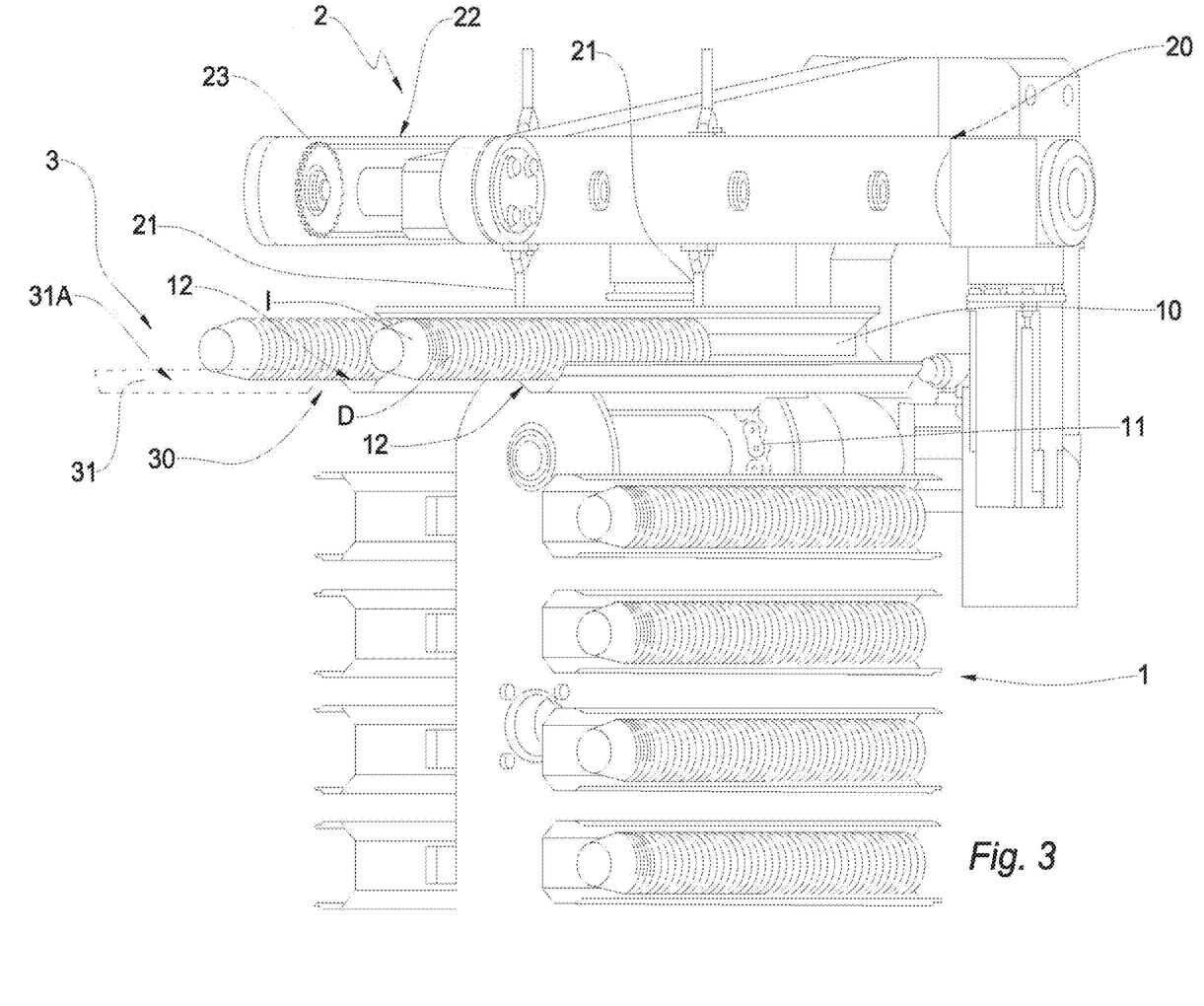
Figure 4:
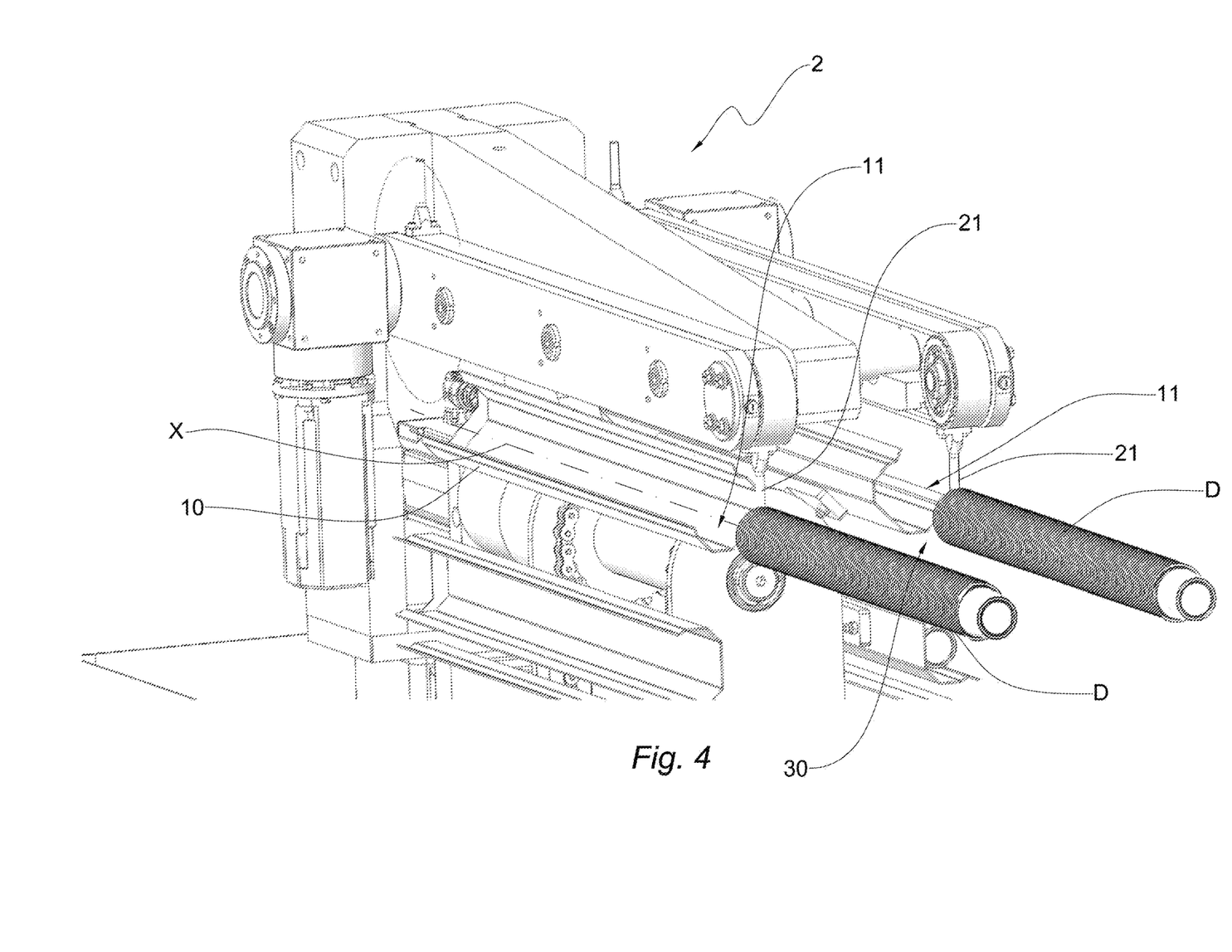

With reference now also to FIGS. 3 and 4, in some embodiments, the feeding device 1 is configured to position, in sequence, each elongated transport element 10 at an interchange zone 30, schematically represented in FIGS. 3 and 4 and whose characteristics will be illustrated in greater detail below.

The interchange zone 30 is advantageously defined at an unloading device 3 configured to receive through this interchange zone 30 a discrete row D which is unloaded from the transport element 10 through its open end 12. The unloading device 3 is preferably connected to further stations of the packaging machine, not shown in the figure, and is intended to feed a continuous row L of articles, schematically shown in FIG. 5, to further stations for further processings.

Figure 10:
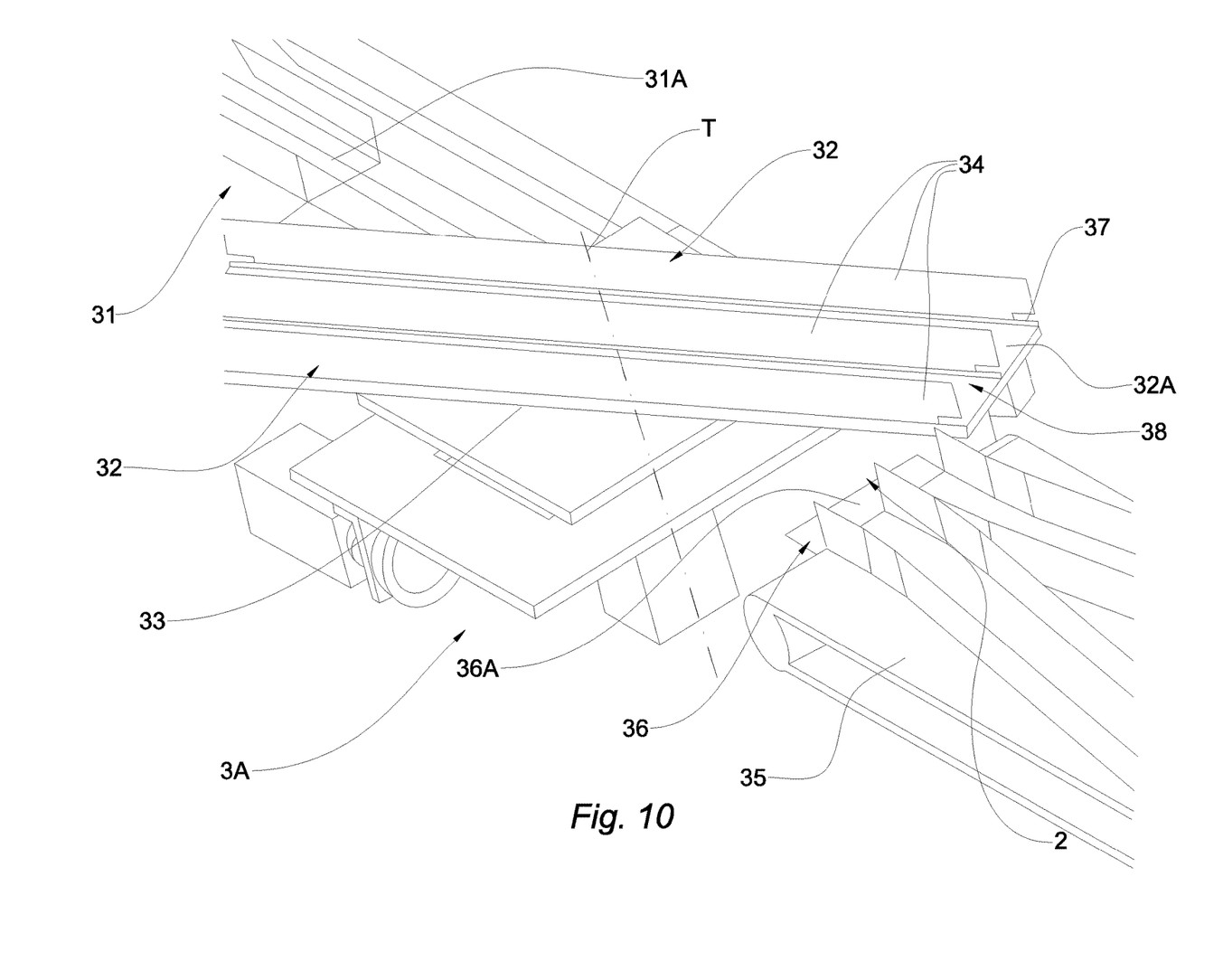
FIG. 10 is a schematic perspective view of a component of a variant embodiment of an unloading device of the grouping device of the present invention.

In some embodiments, such as the one in FIG. 10, a conveyor 35 may be provided through which said discrete rows are passed. Such a conveyor 35 may serve, for example, to bring two continuous rows L of articles closer together, which certain embodiments of the device according to the present invention permit.

Figure 5:
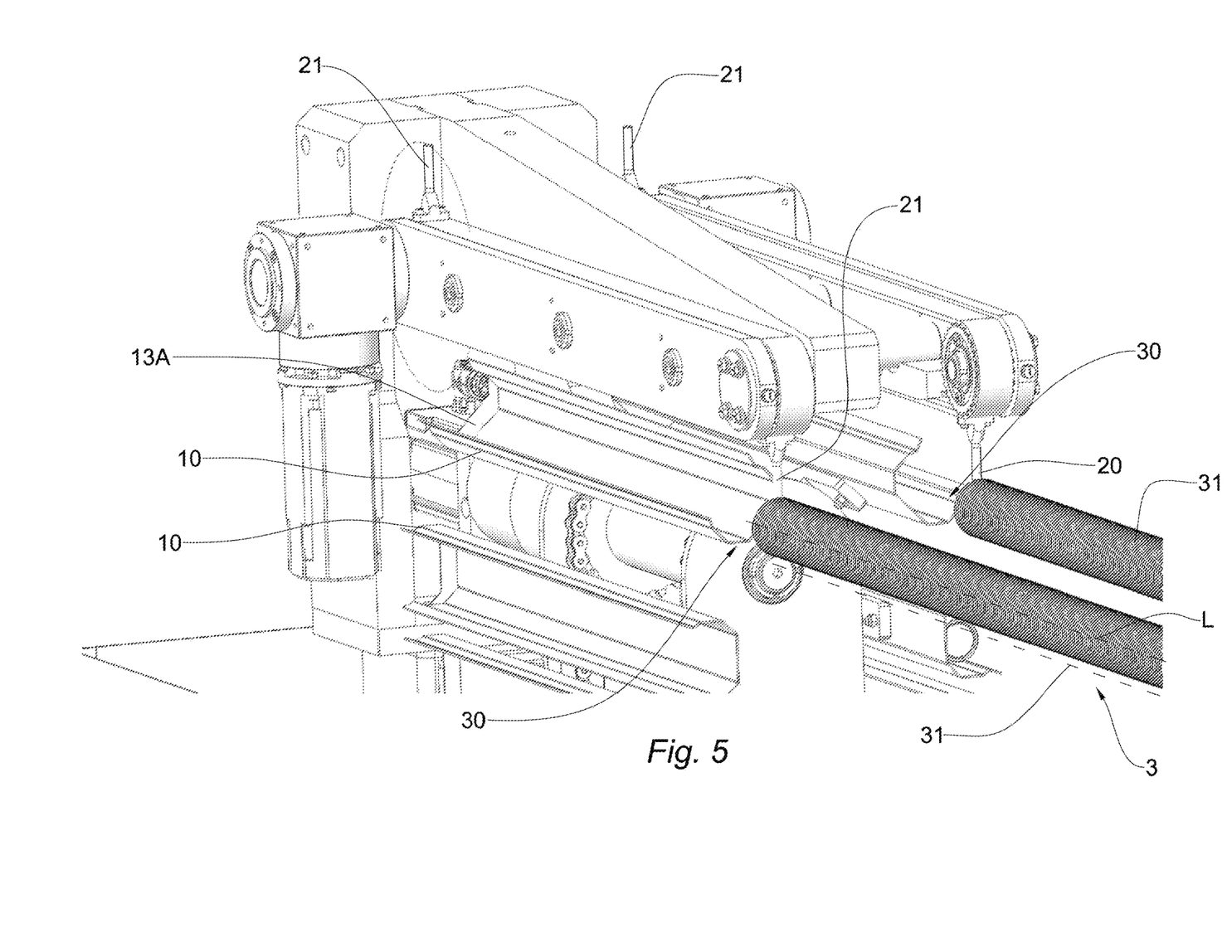

In some embodiments, such as that of FIGS. 3 to 5, the discrete row D may be directly unloaded onto a support element 31 configured to receive a plurality of discrete rows D unloaded from the feeding device 1 and to form a corresponding continuous row L to be transferred to further stations of the packaging machine.

The support element 31 may, for example, comprise a sliding surface 31A, schematically represented in FIG. 3, on which the continuous row L of articles I is made to transit. The sliding surface 31A may be either a fixed surface, on which the continuous row L slides, or a movable surface, such as that of a conveyor belt.

In order to push discrete rows D of articles I outside the transport elements 10, the grouping device 100 preferably comprises a pusher device 2, illustrated in detail in a preferred embodiment thereof in FIGS. 2 to 5.

Advantageously, as can be seen from FIG. 3, the pusher device 2 is configured to abut against the discrete row of articles I so that it slides out of the elongated transport elements 10 through its respective longitudinal end 12.

In some embodiments, such as the one depicted in the Figure, the grouping device 100 comprising a pair of pusher devices 2, each pusher device 2 being configured in such a way as to abut against a respective discrete row D of articles I, placed on a respective elongated transport element 10.

Preferably, the pusher devices 2 of said pair of pushers 2 are arranged side by side.

It will be appreciated that, in preferred embodiments the feeding device 1 defines a transport path 16 of said elongated transport elements 10 comprising at least one curved segment 16C.

As can be seen from the figures, in particular FIG. 2, in such embodiments, the pair of pusher devices 2 may advantageously be configured such that the pusher elements 21 of each pair of pusher devices 2 abut against the discrete row D of articles I at a respective position of the curved segment 16C. As can be seen from FIG. 2, for example, the distance between two adjacent transport elements 10 is greater in this segment than in straight segments, which allows better use of spaces.

It will also be appreciated that the transport path 16 may comprise in some embodiments an ascending vertical segment 16A and a descending vertical segment 16B. The ascending vertical segment 16A and the descending vertical segment 16B are advantageously joined by the curved segment 16C.

In some embodiments, this curved segment 16C may have an angular development of 180° so as to reverse the direction of the transport direction from the vertical direction.

The characteristics of preferred embodiments of the pusher 2 device will be explained below. Note that reference will be made to a single pusher device 2 as the present invention also contemplates the presence of a single pusher device 2. It is understood that the characteristics shown below may also be applied to the other pusher(s) in the grouping device.

Still with reference to FIG. 3, the pushing action by the pusher device 2 is preferably achieved by means of a pusher element 21 movable in a direction substantially parallel to the longitudinal axis X. When the pusher element 21 abuts against the discrete row D, for example at one end thereof, it is pushed in the advance direction of the pusher element 21 and, therefore, in a direction substantially parallel to the longitudinal axis X.

For this purpose, in some embodiments, the pusher element 21 is in the form of a rod which develops away from a path along which the pusher element 21 itself is made to advance. These rods are advantageously configured to abut against the end of the discrete row D as described above.

Preferably, the pusher device 2 comprises a movement device 20 of the pusher element 21. In some embodiments, the movement device 20 may be configured to transport the pusher element 21 along a closed path. In preferred embodiments the closed path comprises a straight segment, preferably parallel to the longitudinal axis X of the transport element.

The closed path may for example be defined by a strip-like element 22, such as a toothed belt, wound on a pair of pulleys 23.

It will be appreciated that in embodiments in which a pair of pusher devices 2 are present, advantageously the pulleys 23 of a first pusher device 2A are configured to rotate about a same axis of rotation Z as the pulleys 23 of a second pusher device 2B of said pair of pusher devices 2.

It will also be appreciated that the pusher device 2 may comprise a pair of pusher elements 21 placed at different positions along the closed path.

In this way, when a first pusher element 21A travels along said straight segment, a second pusher element 21B travels along another segment of said closed path, preferably opposite the straight segment. The reciprocal position of the pusher elements 21A and 21B can be appreciated by comparing their positions in FIGS. 2 to 5.

Figure 6:
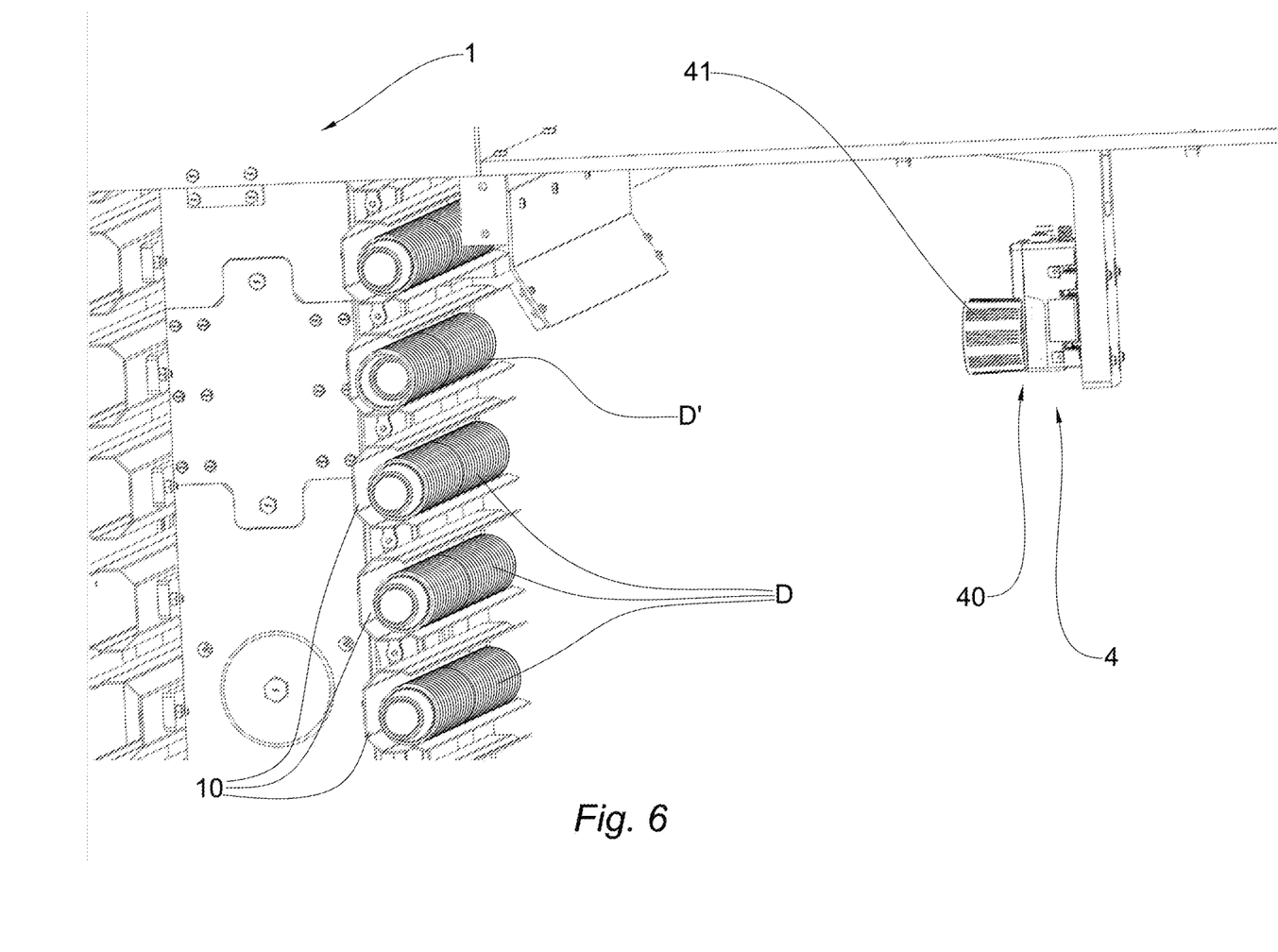
FIGS. 6 to 9 are schematic views in side perspective, in detail, of the device in FIG. 1, illustrating different operating steps when there is a reject in the discrete rows to be grouped.

With reference now to FIG. 6, in some embodiments the grouping device 100 comprises a control device 4 configured to control one or more features of the discrete rows D.

Preferably said control device 4 comprises an optical device 40, for example a vision group 41 such as a camera.

The operation of the control device is illustrated in FIGS. 6 to 9.

As can be seen from FIG. 6, there may be a discrete row in the feeding device that is defective. By way of example, the feeding device 1 may carry, next to a series of correctly oriented discrete rows D, a discrete row D oriented opposite to the others. Such a reversed discrete row D' is not suitable for use in the packaging machine and, for this reason, must be discarded or, alternatively, as will be illustrated with respect to the embodiment in FIG. 10, reversed.

Obviously, there may also be other defects or issues on the basis of which it may be deemed necessary to discard a discrete row D and the process described below is also applicable in such further cases.

For this purpose, the control device 4 may be configured to detect if one or more of the discrete row characteristics D controlled by the control device 4 does not correspond to an expected value. This can therefore be done, for example, by acquiring a video image of the discrete row D but different types of control can also be provided depending on the feature to be examined.

Figure 7:
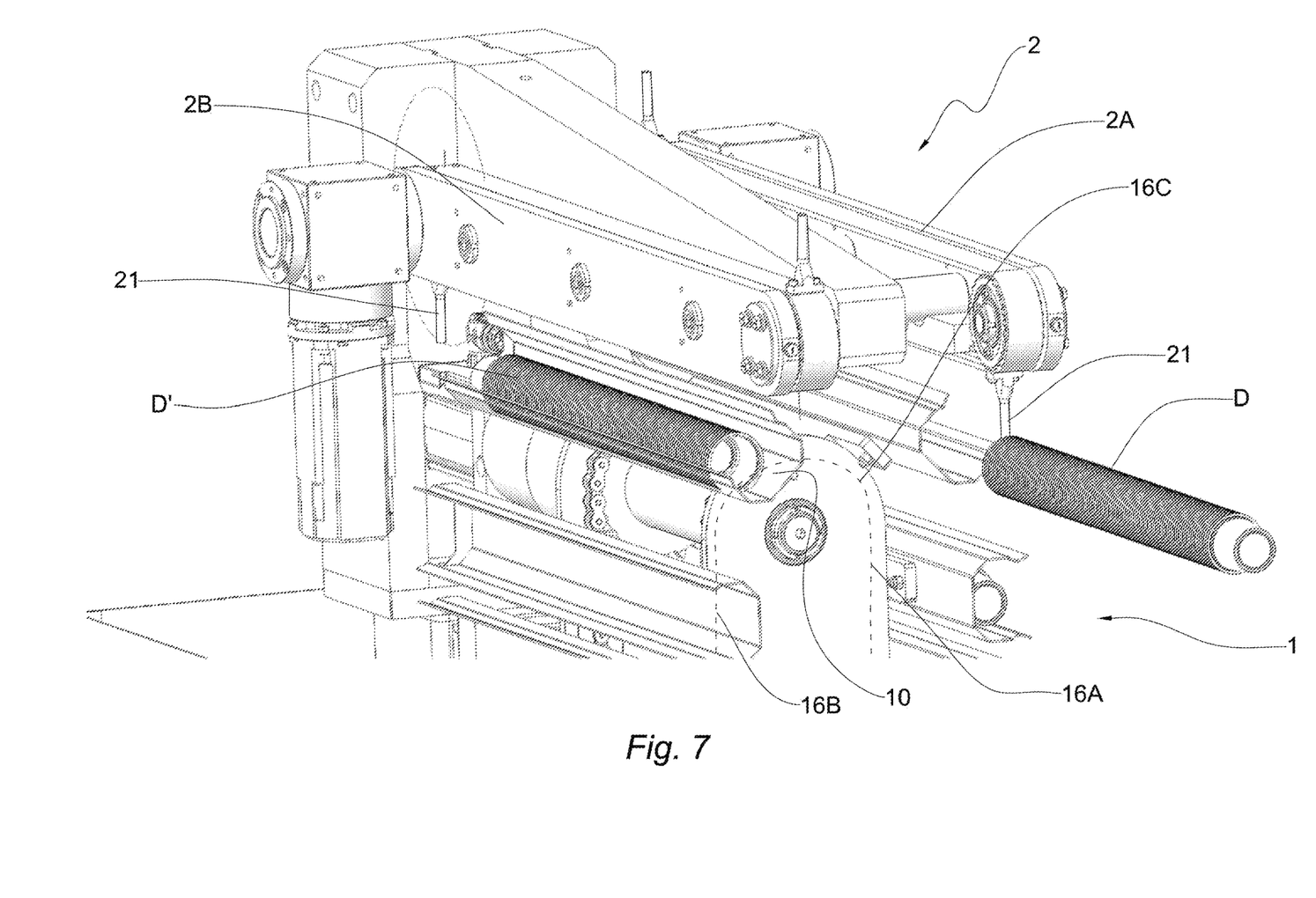

As can be seen from FIG. 7, in the event that a reversed discrete row D' or other type of deviation from the expected characteristics is detected, when the discrete row D' reaches the pusher device 2, the actuation of the pusher device is inhibited and the discrete row D' to be discarded is not advantageously discharged from the transport element 10.

Preferably, in the case of two pusher devices 2A, 2B, if there is only one discrete row D' to be discarded the operation of the other pusher device may take place normally, by discarding the discrete row D which meets the envisaged requirements.

Figure 8:
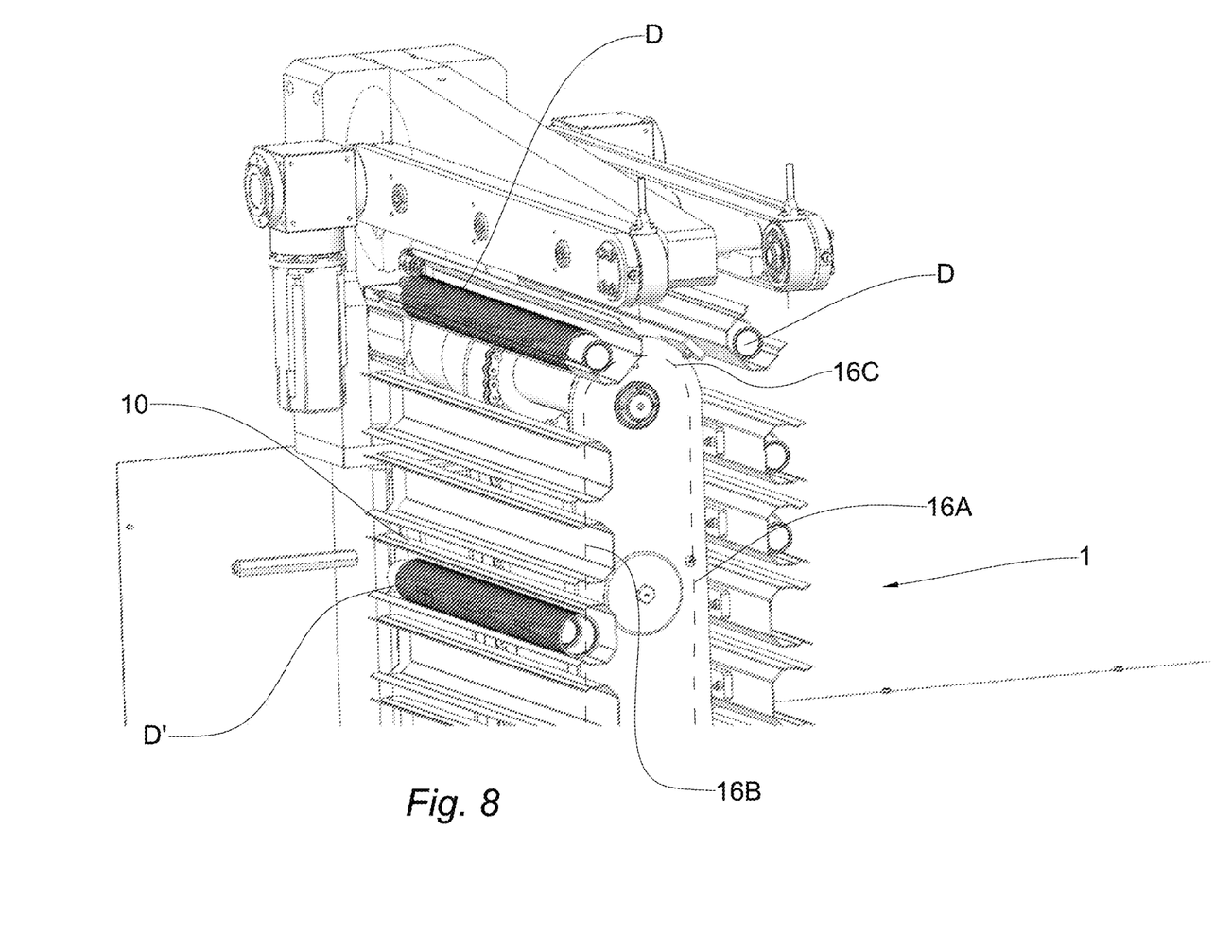
Figure 9:
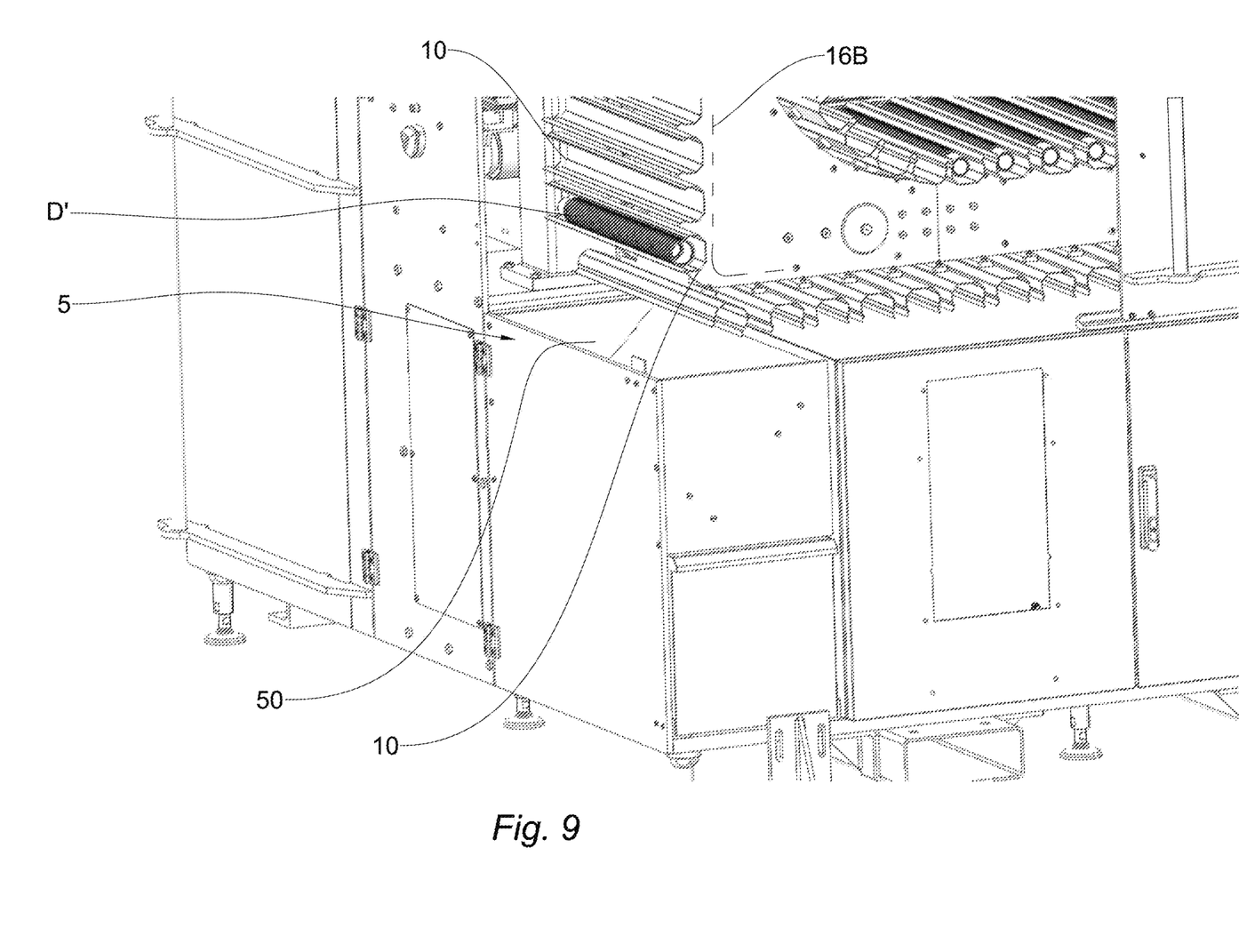

As can be seen from FIG. 8, if the actuation of the pusher device is inhibited, the discrete row D' to be discarded continues its movement by means of the feeding device 1, preferably towards a discard zone 5, illustrated in FIG. 9. In other words, the discrete row D' to be discarded is maintained on the feeder device 1 and transported to the discard zone 5 if one or more of the discrete row characteristics checked does not correspond to an expected value.

Preferably, the discard zone 5 comprises a discharge container 50 preferably placed at the end of the descending vertical segment 16B that is traversed by the transport elements 10.

Once the discharge container 50 has been reached, it is possible to unload, preferably by fall, the discrete row D' from the feeder device 1.

It will also be appreciated that the operation of pusher device 2 can proceed normally after the discrete row D' to be discarded has been transported beyond the operation of pusher device 2 itself. In this way, the presence of a defect has little effect on the productivity of the grouping device 100.

With reference now to FIG. 10, in some embodiments, it may be provided that the unloading device 3 comprises a rotation device 3A configured to reverse the direction of alignment of said discrete row D'.

Preferably, the rotation device 3A comprises a rotating support 32 configured to rotate 180° with respect to an axis T substantially perpendicular to the axis of alignment A of the discrete row D. Preferably, the rotating support 32 comprises further lateral walls 34 which allow defining a guide 38 for the discrete rows D as they pass on the rotating support 32. A sliding surface 32A can therefore be defined on the rotating support 32, on which the discrete row slides, possibly pushed by the same pusher device 2 in charge of unloading the discrete rows D from the transport elements 10 or a further dedicated pusher device.

It will be appreciated that in FIG. 10 two rotating supports 32 are shown, in analogy with the previously described embodiments, in which there are two pusher devices 2. However, it will be appreciated that the same concepts can also be applied in the case where a single pusher device 2 or a larger number of pusher devices 2 are used.

In any case, in embodiments comprising two pusher devices 2, the rotation device 3A may comprise a pair of rotating supports 32 mounted on a common rotating platform 33.

It should also be noted that FIG. 10 represents the rotating supports 32 during rotation.

During normal operation of the grouping device, i.e. when no discrete rows D' are detected to be reversed, the rotating supports 32 are aligned with the longitudinal axis X or, more generally, with the axis of alignment A of the rows being unloaded from the transport elements 10.

Preferably, the rotating support 32 is arranged downstream of the conveyor 35, if present. It will be appreciated, however, that in other embodiments, the rotating support 32 may be placed immediately downstream of the said interchange zone 30.

Preferably, the conveyor 35 comprises a chute 36 projecting towards the rotating support 32, so as to ease the transit of the discrete rows D towards the support 32 itself. In some embodiments, therefore, the chute 36 also defines a respective sliding surface 36A of the discrete rows.

In some embodiments, a recess 37 is defined in the lateral walls 34 configured to accommodate the chute 36 when the lateral walls 34 are aligned with said longitudinal axis X. This allows the rotating support 32 to be rotatable without defining an excessive distance with the conveyor 35.

In this way, an adequate continuity in the support surface of the discrete rows can be ensured during their movement and, at the same time, the ability to rotate the rotating support 32 can be provided for.

Also for the same purpose, the sliding surface 36A of the chute is preferably at a vertically higher position than that of the rotating support 32 and/or that of the support element 31. Preferably, the sliding surface 32A of the rotating support is itself at a position vertically higher than that of the support element.

In this way, the discrete rows will not risk getting stuck in any discontinuities as they advance.

In some embodiments, the rotating support 32 may be translatable with respect to a position of alignment with the longitudinal axis X of the elongated transport element on which said pusher device 2 acts.

In this way, for example in the case of a pair of rotating supports 32, it will be possible to correctly align the rotating support 32 in which the discrete row D' to be rotated is present and to advance it coherently with the other rows that make up the continuous row L.

A person skilled in the art may, in order to meet specific and contingent application requirements, make further modifications and variants of the above-described invention within the scope of protection as defined by the following claims.

The invention claimed is:

1. A grouping device for grouping discrete rows of articles into a continuous row of articles, comprising:
   a feeding device including a plurality of elongated transport elements configured to support at least one of discrete rows of articles, wherein each elongated transport element defines a respective seat mainly extending along a longitudinal axis, in which seat an open or openable longitudinal end is defined;
   a pusher device configured to abut against the at least one discrete row of articles so that the at least one discrete row slide out of one of said elongated transport elements through a respective longitudinal end;
   an unloading device configured to receive, through an interchange zone, the at least one discrete row discharged through the respective longitudinal end, and
   a control device configured to control one or more characteristics of the discrete rows in said feeding device, wherein said one or more characteristics comprise a direction of alignment of said discrete row of articles with respect to said longitudinal axis, wherein said control device is configured to temporarily inhibit operation of said pusher device if one or more of the one or more characteristics of the discrete row controlled by the control device do not correspond to an expected value,
the feeding device being configured to position, in sequence, each elongated transport element at said interchange zone.

2. The grouping device according to claim 1, wherein each said elongated transport element defines a sliding direction of said discrete row of articles toward said open or openable longitudinal end.

3. The grouping device according to claim 1, wherein said pusher device comprises at least one pusher element movable in a direction substantially parallel to said longitudinal axis.

4. The grouping device according to claim 3, wherein said pusher device comprises a movement device for said pusher element, said movement device being configured to transport said pusher element along a closed path, said closed path comprising a straight portion parallel to said longitudinal axis.

5. The grouping device according to claim 4, wherein said closed path is defined by a strip-like element wound on a pair of pulleys.

6. The grouping device according to claim 4, wherein the pusher device comprises a pair of pusher elements placed in different positions along said closed path so that, when a first pusher element of said pair of pusher elements travels along said straight portion, a second pusher element of said pair of pusher elements travels along another segment of said closed path, opposite to said straight segment.

7. The grouping device according to claim 1, wherein said unloading device comprises a support element configured to receive a plurality of discrete rows discharged from said feeding device and to form said continuous row.

8. A grouping device for grouping discrete rows of articles into a continuous row of articles, comprising:
   a feeding device including a plurality of elongated transport elements configured to support at least one of discrete rows of articles, wherein each elongated transport element defines a respective seat mainly extending along a longitudinal axis, in which seat an open or openable longitudinal end is defined;
   a pusher device configured to abut against the at least one discrete row of articles so that the at least one discrete row slide out of one of said elongated transport elements through a respective longitudinal end;
   an unloading device configured to receive, through an interchange zone, the at least one discrete row discharged through the respective longitudinal end;
   a control device configured to control one or more characteristics of the discrete rows in said feeding device, wherein said one or more characteristics comprise a direction of alignment of said discrete row of articles with respect to said longitudinal axis, and
   a discarding zone, said feeding device being configured to transport the discrete row to said discarding zone when one or more of the one or more characteristics of the discrete row controlled by the control device do not correspond to an expected value,
the feeding device being configured to position, in sequence, each elongated transport element at said interchange zone.

9. The grouping device according to claim 8, wherein said discarding zone comprises a waste container placed at an end of a vertical descending segment.

10. A grouping device for grouping discrete rows of articles into a continuous row of articles, comprising:
    a feeding device including a plurality of elongated transport elements configured to support at least one of discrete rows of articles, wherein each elongated transport element defines a respective seat mainly extending along a longitudinal axis, in which seat an open or openable longitudinal end is defined;
    a pusher device configured to abut against the at least one discrete row of articles so that the at least one discrete row slide out of one of said elongated transport elements through a respective longitudinal end; and
    an unloading device configured to receive, through an interchange zone, the at least one discrete row discharged through the respective longitudinal end, wherein said unloading device comprises a rotation device configured to reverse a direction of alignment of said discrete row, wherein said rotation device comprises a rotating support configured to rotate 180° with respect to an axis perpendicular to an axis of alignment of said discrete row,
the feeding device being configured to position, in sequence, each elongated transport element at said interchange zone.

11. The grouping device according to claim 10, wherein said rotating support is translatable with respect to a position of alignment with the longitudinal axis of the elongated transport element on which said pusher device is configured to act, said rotating support being translatable in a direction perpendicular to said longitudinal axis.

12. A grouping method for grouping discrete rows of articles into a continuous row of articles, each discrete row defining a respective axis of alignment, said grouping method comprising:
    arranging a plurality of discrete rows of articles on a feeding device so that each discrete stack of articles defines a respective axis of alignment;
    pushing a discrete row of said plurality of discrete rows so that the discrete row slides along said respective axis of alignment;

unloading the discrete row from said feeding device by passing the discrete row, unloaded through a longitudinal end, through an interchange zone;

moving the plurality of discrete rows of articles by said feeding device to position, in sequence, each discrete stack of articles in said interchange zone;

monitoring one or more characteristics of the plurality of discrete rows of articles prior to said pushing said discrete row, and transporting said discrete row to a discarding zone when one or more of the monitored one or more characteristics of the discrete row do not correspond to an expected value.

13. The grouping method according to claim 12, comprising unloading, by falling, from the feeding device, said discrete row transported to the discarding zone.

14. The grouping method according to claim 12, wherein said one or more characteristics comprise a direction of alignment of said discrete row with respect to said respective axis of alignment.

15. A grouping method for grouping discrete rows of articles into a continuous row of articles, each discrete row defining a respective axis of alignment, said grouping method comprising:

arranging a plurality of discrete rows of articles on a feeding device so that each discrete stack of articles defines a respective axis of alignment;

pushing a discrete row of said plurality of discrete rows so that the discrete row slides along said respective axis of alignment;

unloading the discrete row from said feeding device by passing the discrete row, unloaded through a longitudinal end, through an interchange zone;

moving the plurality of discrete rows of articles by said feeding device to position, in sequence, each discrete stack of articles in said interchange zone; and reversing a direction of alignment of said discrete row if the direction of alignment does not correspond to a predetermined direction.

* * * * *